(12) United States Patent
Hill et al.

(10) Patent No.: US 10,214,180 B2
(45) Date of Patent: Feb. 26, 2019

(54) SYSTEMS AND METHODS FOR MACHINE SENSING AND COMMUNICATION

(71) Applicant: Emerson Electric Co., St. Louis, MO (US)

(72) Inventors: Jason E. Hill, St. Louis, MO (US); Thomas E. Fogarty, Alton, IL (US); David R. Lathrop, Edwardsville, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 15/630,743

(22) Filed: Jun. 22, 2017

(65) Prior Publication Data

US 2017/0369032 A1 Dec. 28, 2017

Related U.S. Application Data

(60) Provisional application No. 62/354,343, filed on Jun. 24, 2016.

(51) Int. Cl.
*A47L 11/40* (2006.01)
*A47L 5/00* (2006.01)
(Continued)

(52) U.S. Cl.
CPC ............ *B60R 25/1004* (2013.01); *A47L 5/36* (2013.01); *A47L 5/365* (2013.01); *A47L 9/02* (2013.01);
(Continued)

(58) Field of Classification Search
CPC ............... B60R 25/1004; B60R 25/33; B60R 2325/101; B60R 2325/105; G01D 9/005; G01V 1/22; G06F 9/468; G08B 25/009; G08B 25/10; G08B 25/007; H04L 12/66; H04L 209/06; H04L 67/10; H04L 67/12;
(Continued)

(56) References Cited

U.S. PATENT DOCUMENTS 4,733,430 A 3/1988 Westergren
4,733,431 A 3/1988 Martin
(Continued)

FOREIGN PATENT DOCUMENTS

WO 0041104 A2 7/2000
WO 2015079260 A1 6/2015

*Primary Examiner* — Ly D Pham
(74) *Attorney, Agent, or Firm* — Armstrong Teasdale LLP

(57) ABSTRACT

An apparatus and method for monitoring the productivity of a portable machine are provided. The method includes receiving motion data for at least one component of the portable machine from a multi-axis accelerometer, receiving position data for the at least one component from a process parameter sensor communicatively coupled to the at least one component, and determining, based on the received motion data and the received position data that the at least one component is oriented in a predetermined position for productive operation. The method also includes determining an area of productive operation using at least one physical dimension of the at least one component and the received motion data when the at least one component is oriented in the predetermined position for productive operation and incrementing a total area counter based on the determination.

17 Claims, 10 Drawing Sheets

(51) Int. Cl.

| | |
|---|---|
| *B60R 25/10* | (2013.01) |
| *B60R 25/33* | (2013.01) |
| *G01D 9/00* | (2006.01) |
| *G01V 1/22* | (2006.01) |
| *G06F 9/46* | (2006.01) |
| *G08B 25/00* | (2006.01) |
| *G08B 25/10* | (2006.01) |
| *H04L 12/66* | (2006.01) |
| *H04L 29/06* | (2006.01) |
| *H04L 29/08* | (2006.01) |
| *A47L 5/36* | (2006.01) |
| *A47L 9/02* | (2006.01) |
| *A47L 9/28* | (2006.01) |
| *A47L 11/00* | (2006.01) |
| *H04L 12/931* | (2013.01) |
| *H04W 4/02* | (2018.01) |
| *H04L 12/28* | (2006.01) |
| *H04W 84/18* | (2009.01) |
| *H04W 12/06* | (2009.01) |

(52) U.S. Cl.
 CPC ........... *A47L 9/2805* (2013.01); *A47L 9/2821* (2013.01); *A47L 9/2831* (2013.01); *A47L 9/2857* (2013.01); *A47L 11/00* (2013.01); *B60R 25/33* (2013.01); *G01D 9/005* (2013.01); *G01V 1/22* (2013.01); *G06F 9/468* (2013.01); *G08B 25/009* (2013.01); *G08B 25/10* (2013.01); *H04L 12/66* (2013.01); *H04L 29/06* (2013.01); *H04L 49/351* (2013.01); *H04L 67/10* (2013.01); *H04L 67/12* (2013.01); *H04L 67/22* (2013.01); *H04W 4/02* (2013.01); *B60R 2325/101* (2013.01); *B60R 2325/105* (2013.01); *G08B 25/007* (2013.01); *H04L 12/2803* (2013.01); *H04L 12/2814* (2013.01); *H04L 12/2827* (2013.01); *H04L 63/0823* (2013.01); *H04L 69/329* (2013.01); *H04L 2012/2841* (2013.01); *H04W 12/06* (2013.01); *H04W 84/18* (2013.01)

(58) Field of Classification Search
 CPC ............. H04L 12/2803; H04L 12/2814; H04L 12/2827; H04L 63/0823; H04L 69/329; H04L 2012/2841; H04W 12/06; H04W 84/18

USPC ........................................................ 706/22
See application file for complete search history.

(56) References Cited

U.S. PATENT DOCUMENTS

| | | | |
|---|---|---|---|
| 4,767,213 A | 8/1988 | Hummel | |
| 5,343,590 A | 9/1994 | Radabaugh | |
| 6,026,539 A | 2/2000 | Mouw et al. | |
| 6,571,193 B1 | 5/2003 | Unuma et al. | |
| 6,941,239 B2 | 9/2005 | Unuma et al. | |
| 7,139,651 B2 * | 11/2006 | Knowlton | E02F 9/2037 |
| | | | 701/23 |
| 7,237,298 B2 | 7/2007 | Reindle et al. | |
| 7,864,044 B2 | 1/2011 | Armstrong et al. | |
| 8,096,014 B2 | 1/2012 | Cunningham et al. | |
| 9,089,250 B2 | 7/2015 | Stein | |
| 9,170,111 B2 | 10/2015 | Boschker et al. | |
| 9,829,891 B2 * | 11/2017 | Smith | G05D 1/0231 |
| 2005/0114023 A1 * | 5/2005 | Williamson | G01C 21/165 |
| | | | 701/472 |
| 2006/0091888 A1 * | 5/2006 | Holman | G01V 3/15 |
| | | | 324/326 |
| 2007/0180648 A1 | 8/2007 | Andrup et al. | |
| 2008/0046179 A1 * | 2/2008 | Mackintosh | A63B 24/0021 |
| | | | 701/468 |
| 2008/0167953 A1 | 7/2008 | Shirole et al. | |
| 2009/0089001 A1 * | 4/2009 | Lin | G01C 21/16 |
| | | | 702/92 |
| 2010/0062406 A1 | 3/2010 | Zboray et al. | |
| 2012/0108965 A1 | 5/2012 | Lazebnik | |
| 2012/0174525 A1 | 7/2012 | Hinshaw et al. | |
| 2013/0006718 A1 | 1/2013 | Nielsen et al. | |
| 2013/0130843 A1 * | 5/2013 | Burroughs | A63B 71/0686 |
| | | | 473/415 |
| 2013/0189656 A1 | 7/2013 | Zboray et al. | |
| 2014/0237767 A1 * | 8/2014 | Conrad | A47L 9/2857 |
| | | | 15/353 |
| 2014/0278220 A1 * | 9/2014 | Yuen | G01B 21/16 |
| | | | 702/150 |
| 2015/0258413 A1 * | 9/2015 | Molyneux | A43B 1/0054 |
| | | | 700/91 |
| 2015/0262312 A1 | 9/2015 | Raanan | |
| 2017/0189752 A1 * | 7/2017 | Mohrman | A63B 24/0006 |
| 2017/0296023 A1 * | 10/2017 | Qiao | A47L 11/4041 |

\* cited by examiner

SYSTEMS AND METHODS FOR MACHINE SENSING AND COMMUNICATION

CROSS REFERENCE TO RELATED APPLICATIONS

This application claims priority to and the benefit of the filing date of U.S. Provisional Application No. 62/354,343 filed on Jun. 24, 2016, which is hereby incorporated by reference.

FIELD

This disclosure relates generally to equipment directed to move in multiple dimensions and, more particularly, to sensors, systems, and methods for measuring such movement and reporting conformance of the movement to predetermined desired movements.

BACKGROUND

Known automated equipment is used to perform tasks that would otherwise be performed manually. Using such equipment can reduce the time and labor associated with the tasks thereby improving the efficiency by which the tasks are performed. Many tasks may be performed more efficiently when the equipment is handled in a predetermined manner consistently. To achieve increased efficiency, repetitive training monitoring and feedback from a qualified instructor is required. However, when the instructor's time and effort is considered along with that of an operator handling the equipment, the efficiency improvement is less than what is possible.

For example, an operator using a man-portable cleaning system, such as, a backpack or floor model vacuum cleaning system may be trained to follow a prescribed technique for achieving a predetermined level of efficiency and productivity. To verify that the predetermined level of efficiency and productivity is maintained over time, monitoring of the operator may be required. However, such monitoring typically involves observation by a supervisor while the operator is actively using the vacuum cleaning system. This requires the supervisor to be in close proximity to the operator and to be there at the time that the operator is using the vacuum cleaning system.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one embodiment, a method of monitoring productivity of a portable machine includes receiving motion data for at least one component of the portable machine from a multi-axis accelerometer, receiving position data for the at least one component from a process parameter sensor communicatively coupled to the at least one component, and determining, based on the received motion data and the received position data that the at least one component is oriented in a predetermined position for productive operation. The method also includes determining an area of productive operation using at least one physical dimension of the at least one component and the received motion data when the at least one component is oriented in the predetermined position for productive operation and incrementing a total area counter based on the determination.

In another embodiment, a portable cleaning machine includes a mechanical portion configured to generate a cleaning force, a cleaning head including a first physical dimension and coupled in flow communication to the mechanical portion, and a multi-axis accelerometer positioned on the cleaning head, the multi-axis accelerometer configured to generate motion data of the cleaning head. The portable cleaning machine also includes a machine controller configured to receive motion data for the cleaning head from the multi-axis accelerometer, receive position data for the cleaning head from a process parameter sensor communicatively coupled to the cleaning head, and determine, based on the received motion data and the received position data that the cleaning head is oriented in a predetermined position for productive operation. The machine controller is also configured to determine an area of productive operation using at least one physical dimension of the cleaning head and the received motion data when the cleaning head is oriented in the predetermined position for productive operation and increment a total area counter based on the determination.

In yet another embodiment, one or more non-transitory computer-readable storage media has computer-executable instructions embodied thereon, wherein when executed by at least one processor, the computer-executable instructions cause the processor to receive motion data for a cleaning head of a portable machine from a multi-axis accelerometer, receive position data for the cleaning head from a process parameter sensor communicatively coupled to the cleaning head, and determine, based on the received motion data and the received position data that the cleaning head is oriented in a predetermined position for productive operation. The computer-executable instructions cause the processor to determine an area of productive operation using at least one physical dimension of the cleaning head and the received motion data when the cleaning head is oriented in the predetermined position for productive operation, and increment a total area counter based on the determination Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Embodiments of the methods and systems described herein relate to remotely monitoring how equipment is being used and operated and communicating the information locally to the user or remotely to a supervisor. Labor is the largest cost associated with commercial cleaning. Predetermined cleaning methods and procedures may improve efficiency and optimize productivity of the labor force. Being able to monitor the performance, location, and movements during operation of the various cleaning and maintenance equipment permits managers to determine if the equipment is being used correctly and if more training is needed to ensure it will be used correctly. Also the performance of the equipment can be monitored to determine when maintenance is needed to keep equipment functioning at peak performance and avoid lengthy down times.

Figure 1:
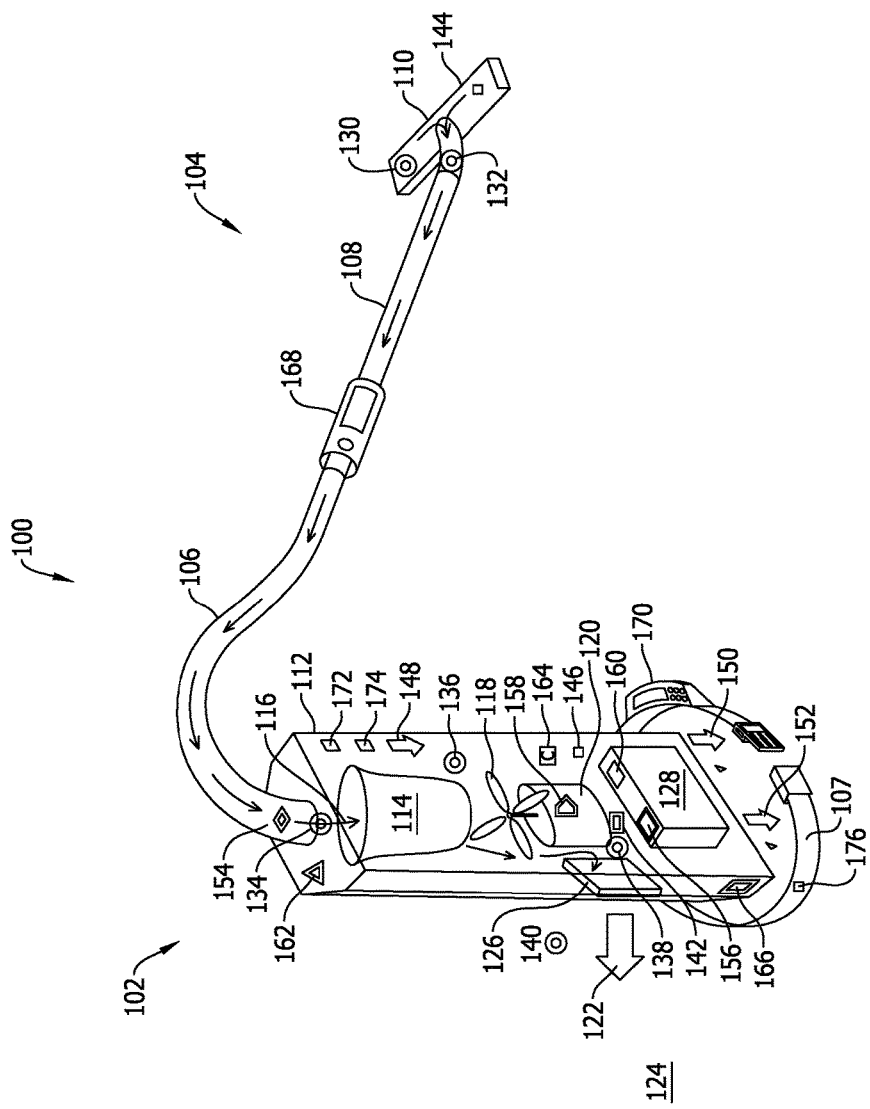
FIG. 1 is a perspective cutaway view of a machine in accordance with an embodiment of the present disclosure.

FIG. 1 is a perspective cutaway view of a machine 100 in accordance with an embodiment of the present disclosure. In the example embodiment, machine 100 is embodied in a backpack style commercial vacuum cleaner. In various other embodiments, machine 100 is embodied in other machines operable by a user, such as, for example, a pressure washer, a leaf blower, and the like. In the example embodiment, machine 100 includes a mechanical portion 102, such as, but not limited to a back or floor-mounted vacuum system or other cleaning apparatus and a wand assembly 104 coupled in flow communication with mechanical portion 102 through a hose 106. In various embodiments, a back-mounted mechanical portion 102 is secured to the operator using a harness 107. In other embodiments, a floor-mounted mechanical portion 102 is supported by, for example, wheels 109 (shown in FIG. 4).

Wand assembly 104 includes a rigid pipe 108 and a sweeper head 110. Mechanical portion 102 includes a housing 112 in which a vacuum assembly and control devices are positioned. A particulate bag and/or filter assembly 114 is configured to receive a flow 116 of particle-entrained air from hose 106. Flow 116 is generated by a fan 118 coupled to a motor 120. A flow 122 of substantially particle-free air is discharged to ambient 124 after passing through filter assembly 114. In some embodiments, a secondary or HEPA filter 126 is used to further reduce the particulates discharged to ambient 124. Motor 120 is powered through a battery 128.

Machine 100 also includes sensors configured to monitor and/or measure process parameters associated with machine 100. Pressure switches include a brush pressure sensor 130, a brush exit pressure sensor 132, a hose exit pressure sensor 134, a filter assembly pressure sensor 136, a fan discharge pressure sensor 138, and an ambient or absolute pressure sensor 140. A fan discharge flow sensor 142 monitors flow through machine 100. Accelerometers include a brush accelerometer 144 and a housing accelerometer 146. Brush accelerometer 144 is mounted on sweeper head 110 to verify that proper movements of wand assembly 104 produce accelerations between, for example, greater than approximately −1.5 g and +1.5 g. Accelerations outside such range indicate machine 100 is not being operated properly for optimum efficiency and productivity. Housing accelerometer 146 can be mounted directly onto housing 112 or other component of housing 112, such as, but not limited to a circuit board and provide further information about the state of machine 100. For example, housing accelerometer 146 is used, in various embodiments, to act as a pedometer to count steps by counting acceleration spikes and to permit an auto wake-up feature of machine 100. Strain sensors include a bag strain sensor 148 and one or more housing strain sensors 150, 152.

Machine 100 also includes one or more dirt pickup sensors 154. Battery 128 is equipped with a "gas gauge" sensor 156 configured to able to accurately measure the amount of charge remaining in battery 128. A battery life model stored in a memory of machine 100 is used to determine remaining charge from a plurality of battery parameters including voltage at rest, voltage during various loadings, current response in changes to battery load, voltage response in changes to battery load, battery temperature, and the like. The model is selectable based on a model number of battery 128 or on manually entered specifications of battery 128. Battery may include an onboard memory for storing the models, algorithms, and look-up tables used by an onboard processor associated with battery 128. In various embodiments, battery 128 may not use onboard memory and processor, but rather transmits data between battery 128 and another of the memories and/or processors associated with machine 100.

Motor 120 includes a motor current sensor 158. Additionally, battery 128 may also include a battery current sensor 160. In various embodiments, motor current sensor 158 is integrated into a machine controller 164. In other embodiments, motor current sensor 158 interfaces with machine controller 164 and provides feedback if motor control is to be implemented and also detects any abnormalities in battery current consumption.

Moreover, in addition to accelerometer sensors, machine 100 also includes a magnetometer 172, and a gyroscope 174, which are used to monitor and measure various movements of machine 100 in multiple dimensions. One or more load cells 176 are used to monitor a force exerted on harness 107 by the weight of machine 100 bearing on the operator or on wheels 109 (shown in FIG. 4).

Figure 2:
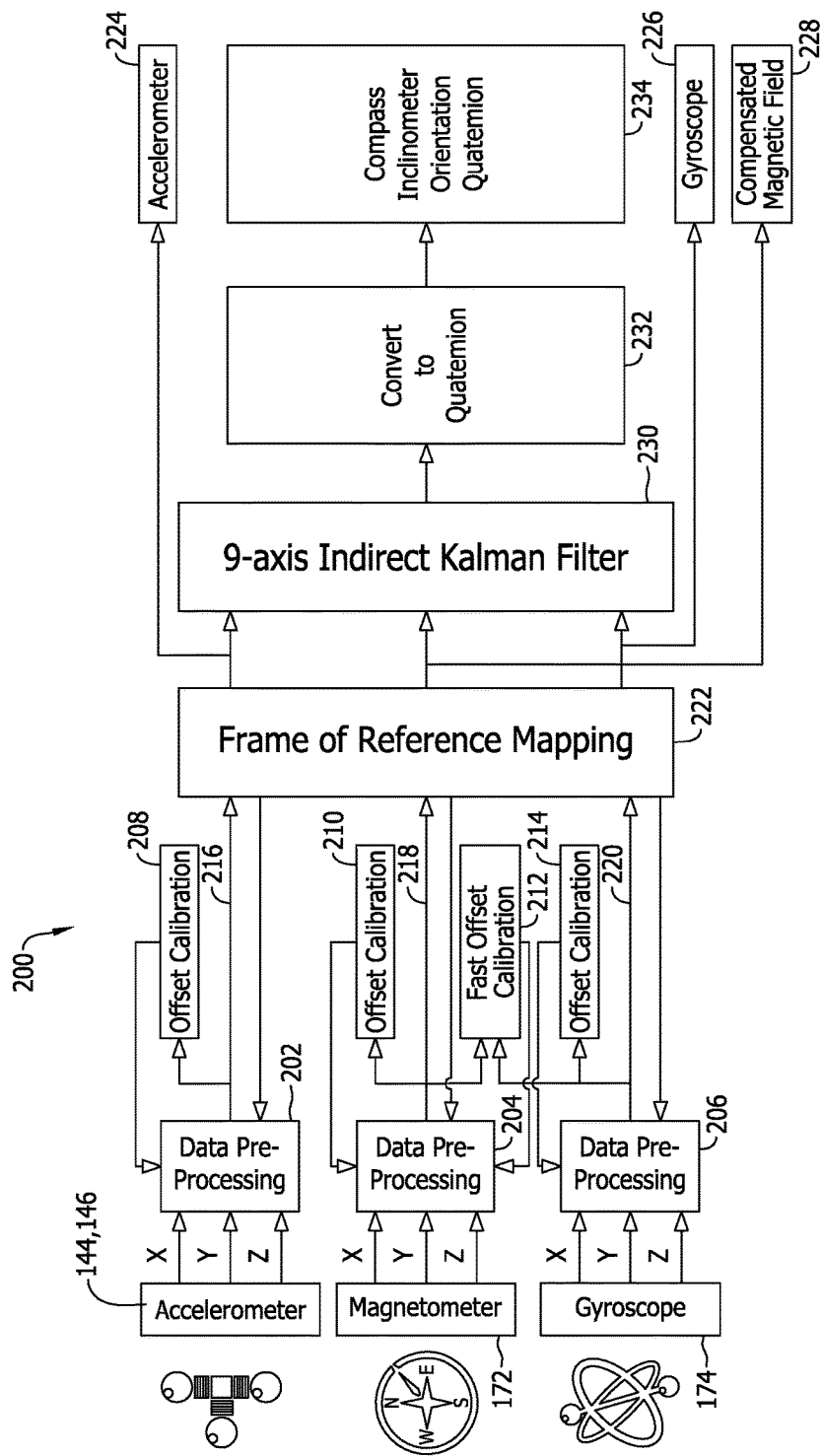
FIG. 2 is a simplified block diagram of a motion and sensor processor that may be used with the machine shown in FIG. 1.

FIG. 2 is a simplified block diagram of an embodiment of a motion and sensor processor 200. Signals generated by brush accelerometer 144, housing accelerometer 146, magnetometer 172, and gyroscope 174 are received by respective preprocessing modules 202, 204, 206, which may be embodied in hardware, software, or firmware implementations. The preprocessed data is then adjusted by respective calibration stages 208, 210, 212, and 214. The calibration stages shown are representative of various signal processing that may occur with all sensors associated with machine 100. The preprocessed signals 216, 218, 220 are transmitted to a frame of reference mapping module 222 and then to an accelerometer output 224, a gyroscope output 226, and a compensated magnetic field output 228. Motion and sensor processor 200 also includes a 9-axis filter 230, for example, but not limited to an indirect Kalman filter, a quaternion converter 232, and compass-inclinometer orientation quaternion module 234.

Figure 3:
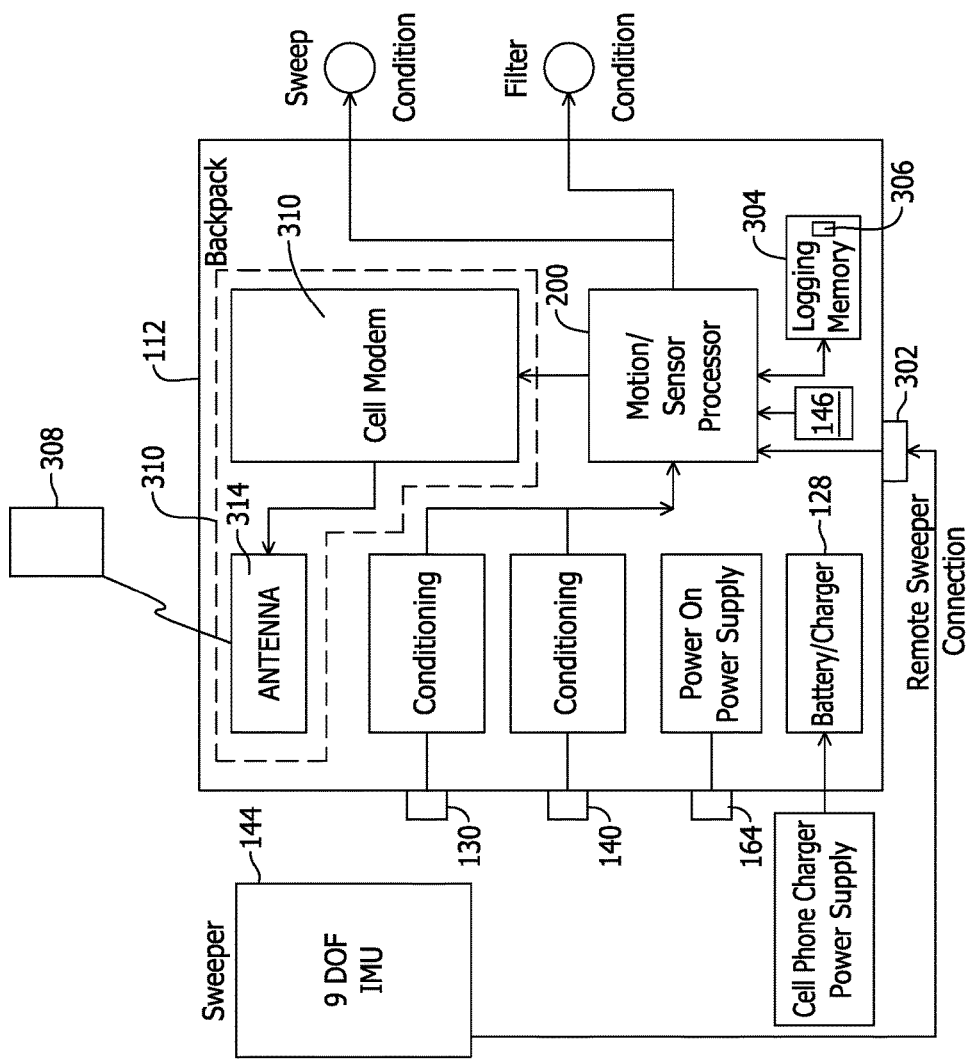
FIG. 3 is a data flow chart for the machine shown in FIG. 1 in accordance with an example embodiment of the present disclosure.

FIG. 3 is a data flow chart for machine 100 in accordance with an example embodiment of the present disclosure. In the example embodiment, sensor inputs are received from, for example, brush accelerometer 144 through a remote sweeper connection 302 to housing 112, housing accelerometer 146, brush pressure sensor 130, absolute pressure sensor 140. The sensor inputs are processed by motion and sensor processor 200 to generate virtual sensor outputs, determine performance metrics, generate maintenance requests, log information to a logging memory 304, which may include a logging database 306, and communicate at least some of the processed inputs to a central server 308 though a wired or wireless interface 310. In various embodiments, wireless interface 310 includes a cellular modem 312 and associated antenna 314.

Figure 4:
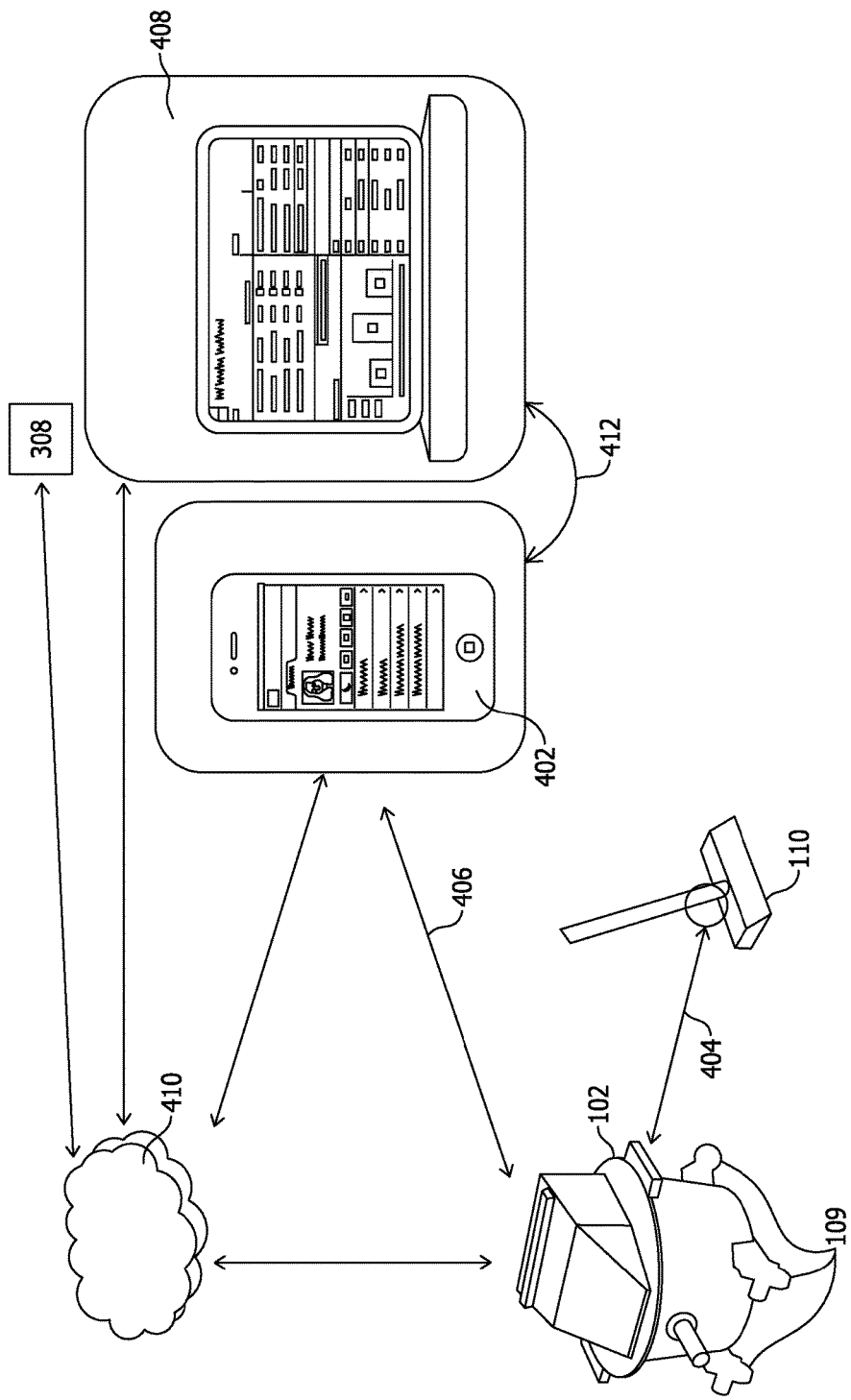
FIG. 4 is another example embodiment of a data flow diagram for the machine shown in FIG. 1.

FIG. 4 is another example embodiment of a data flow diagram for machine 100. Sensors positioned on mechanical portion 102 and sweeper head 110 can communicate directly with a supervisory computer device 402 through communications links 404 and 406. The sensors can also communicate with central server 308 or one or more servers 408 located, for example, at a company head or field office through a network 410, for example, the Internet, cloud, or other network. Supervisory computer device 402 may also communicate directly with one or more servers 408 through a direct communications link 412. Supervisory computer device 402 can communicate with mechanical portion 102, server 408, and other devices using cellular networks, wireless networks, and near field communication networks. In various embodiments, supervisory computer device 402 is configured to manage personnel operating a plurality of machines 100 simultaneously. For example, supervisory computer device 402 is configured to monitor the activities of the machines 100, monitor the performance of machines 100, and monitor alerts and data generated by each of the machines. For example, when any parameter monitored or generated by motion and sensor processor 200 exceeds a threshold value, an alert can be transmitted to supervisory computer device 402. A supervisor responsible for the plurality of machines 100 can then respond to the alert on a prioritized basis. The data communicated to servers 408 can be further processed to address fleet-wide issues determined at servers 408. For example, servers 408 can determine that scheduled maintenance is due on a particular one or more of the plurality of machines 100. Servers 408 can initiate a purchase of consumables or have consumables delivered to a location where at least some of the plurality of machines 100 needing consumables is located. Servers 408 can determine billing for leasing and other business model metrics. Further, servers 408 can be used to determine incentive payments due to operators of the plurality of machines 100.

Figure 5:
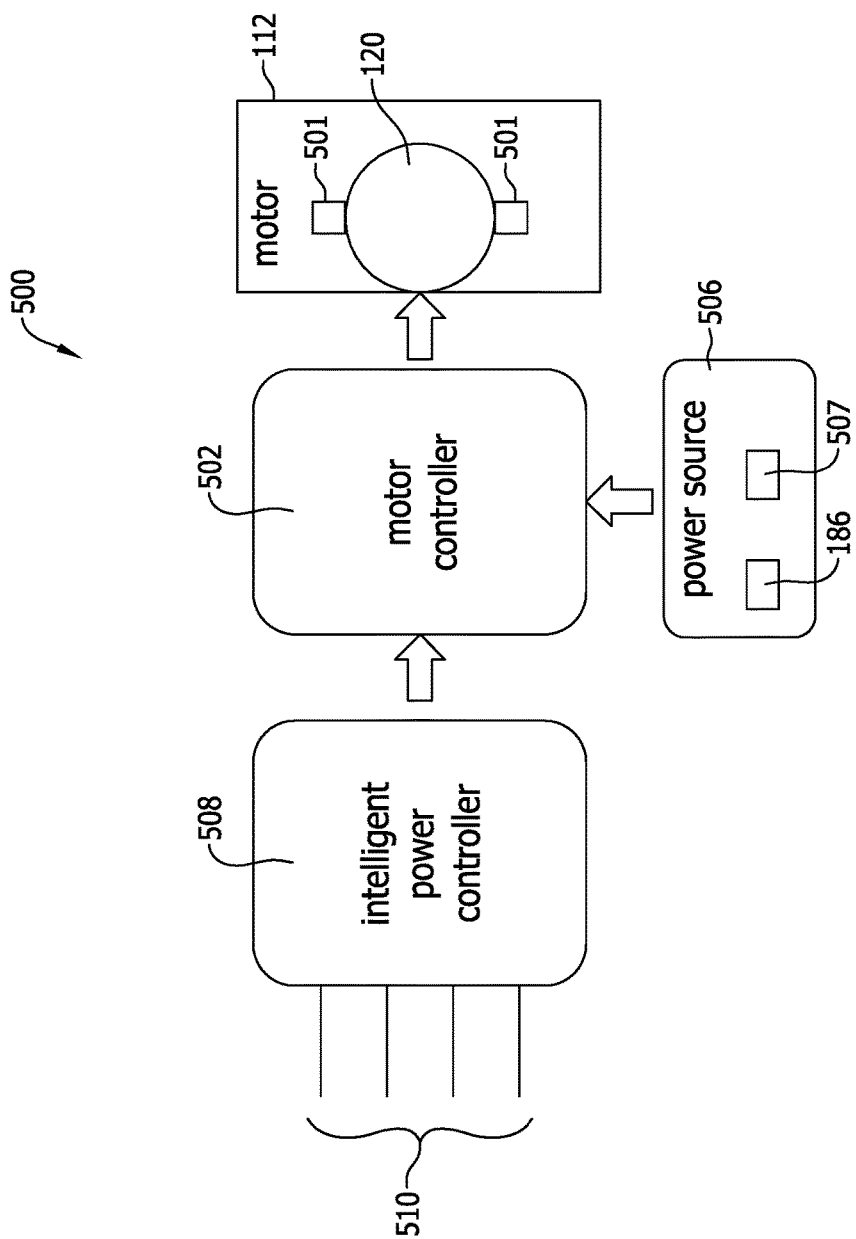
FIG. 5 is a schematic block diagram of a motor control architecture that may be used with machine shown in FIG. 1.

FIG. 5 is a schematic block diagram of a motor control architecture 500 that may be used with machine 100 (shown in FIG. 1). In the example embodiment, motor control architecture 500 includes motor 120, which in another embodiment, includes brushes 501. In various other embodiments, motor 120 is an electrically commutated motor (ECM) that does not require brushes 501. A wearing of brushes 501 is monitored using, for example, an elapsed time counter in machine controller 164 that detects when brushes 501 are approaching end of life (hours used).

In the example embodiment, motor 120 drives fan 118. A motor controller 502 may be a stand-alone device or may be incorporated into another processor operating on machine 100.

A power source 506 is configured to provide electrical power to motor controller 502 for use in powering motor 120. Power source 506 may be embodied in a battery, supercapacitor, fuel cell, or other source of electrical energy. Battery gas gauge 156 and a coulomb counter 507 may be used to determine a status, efficiency, and capacity of power source 506.

An intelligent power controller 508 is configured to receive inputs 510 from sensors (not shown) that are indicative of various operating conditions of machine 100. For example, brush pressure sensor 130 may be used to detect when sweeper head 110 is not in contact with the cleaning surface. Such a condition may warrant reducing motor power to conserve energy when machine 100 is not performing its intended vacuuming function. Intelligent power controller 508 may then operate to command motor controller 502 to reduce power to motor 120 a predetermined amount. Similarly, when sweeper head 110 is returned to its cleaning position proximate the cleaning surface, brush pressure sensor 130 may indicate that cleaning power is again required signaling intelligent power controller 508 to command motor controller 502 to increase power to motor 120 a predetermined amount. Additionally, intelligent power controller 508 may be configured to monitor a current of motor 120 during all phases of operation to continuously adjust current to provide optimal energy consumption and motor and battery protection.

Figure 6:
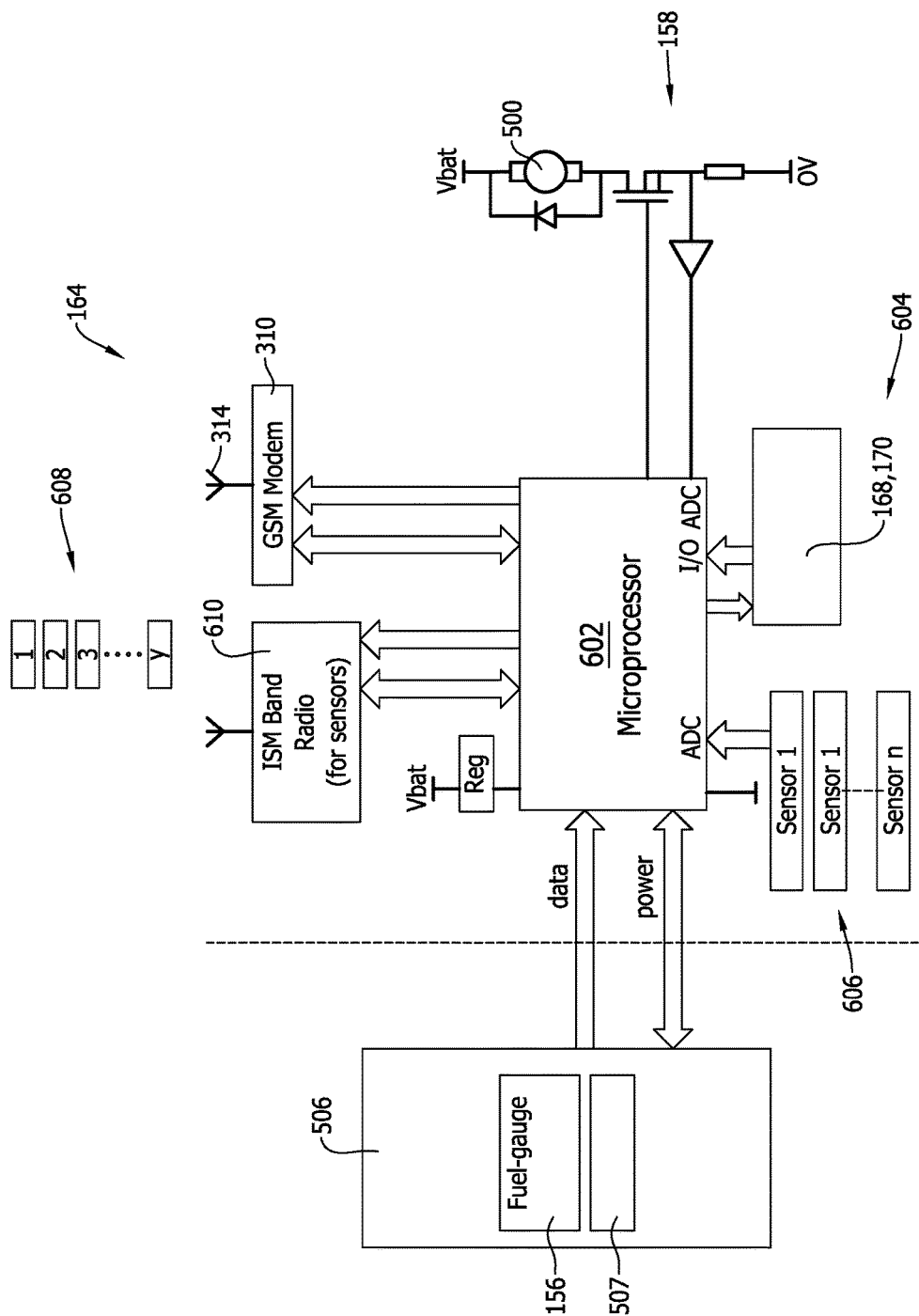
FIG. 6 is a data flow diagram of the machine controller shown in FIG. 1.

FIG. 6 is a data flow diagram of machine controller 164 (shown in FIG. 1). In the example embodiment, machine controller 164 includes a microcontroller or microprocessor 602, support circuitry 604, and interconnections with other components of machine 100. As described above the functions of motor controller 502 (shown in FIG. 5) may be incorporated in machine controller 164, such as, in microprocessor 602.

In the example embodiment, some sensors used in machine 100 are wired sensors 606, which can be communicatively coupled directly to microprocessor 602. Other sensors 608 are coupled wirelessly to microprocessor 602 using, for example, an industrial, scientific, and medical (ISM) radio band transceiver 610.

Figure 7:
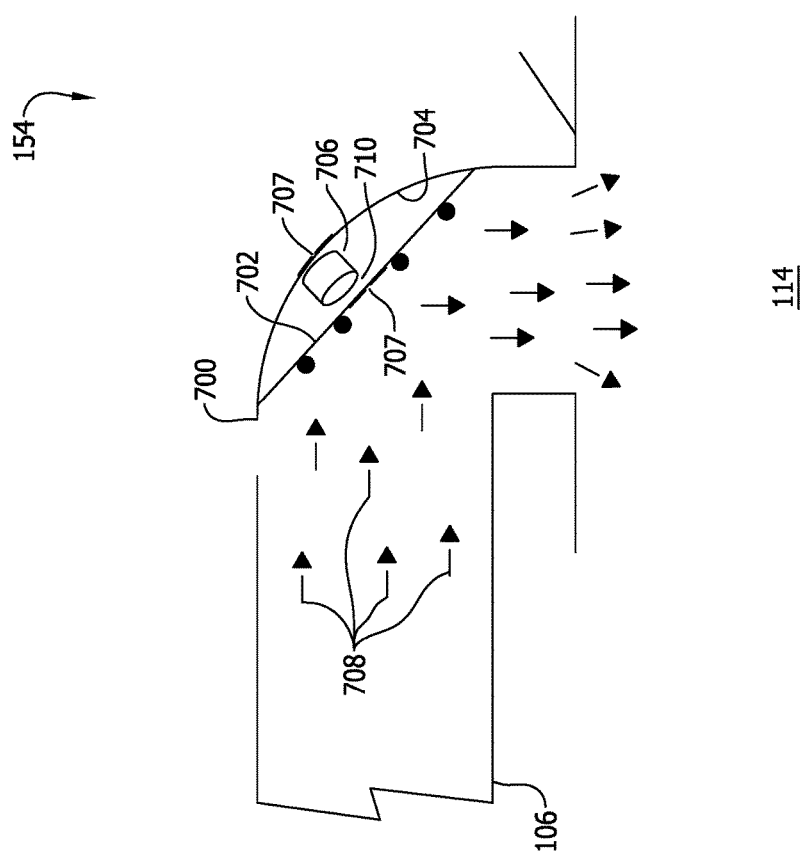
FIG. 7 is a schematic diagram of the dirt pickup sensor shown in FIG. 1.

FIG. 7 is a schematic diagram of dirt pickup sensor 154 (shown in FIG. 1). Dirt pickup sensor 154 is configured to provide an input foe estimating an amount of particulate transiting through hose 106 and being received by filter assembly 114. Dirt pickup sensor 154 may also be used for other detection schemes, such as, but not limited to an airflow through hose 106 and operation of motor 120. For example, motor 120 may appear to be operational because of a measured current flow to motor 120, but there could be a problem with the impeller associated with fan 118. In the example embodiment, dirt pickup sensor 154 includes a body 700 that includes a right-angled cross-section. An impact plate 702 spans an inside curve 704 of the right-angled cross-section to form a cavity 705. In one embodiment, cavity 705 is sealed from hose 106 such particles cannot enter cavity 705. In other embodiments, cavity 705 is not sealed and may be open, for example, through an aperture 707 to at least one of hose 106 or ambient 124 surrounding body 700. A microphone 706 is positioned between body 700 and impact plate 702. Microphone 706 may be positioned spaced apart from impact plate 702 or be mounted on impact plate 702, or otherwise directly coupled to impact plate 702. Microphone 706 may be embodied in a piezoelectric device, a microelectromechanical system (MEMS) device, other solid-state device, or in a non-solid state device.

During operation, particles 708 enter body 700 from hose 106. At curve 704, the air carrying particles 708 turns to follow curve 704. Because of the momentum of particles 708, particles 708 cannot readily make the turn around curve 704 and at least a portion of particles 708 collide with impact plate 702. Each impact generates a vibration in impact plate 702 which can be detected by sensor or microphone 706 directly or through sound generated by impact plate 702 in the air in a space 710 between microphone 706 and impact plate 702. Microphone 706 generates a signal that is proportional to an amount of particles 708 being transmitted from wand assembly 104 to filter assembly 114. Given the different vibration or sound characteristics of the different types of dirt that may be encountered, several algorithms are used to distinguish an apparent change in particulate flow from merely a change in the type of dirt. For example, fluff may not be able to generate a vibration as readily as sand or small rocks. The algorithms are able to distinguish between fluff and heavier or more solid particles 708.

Figure 8:
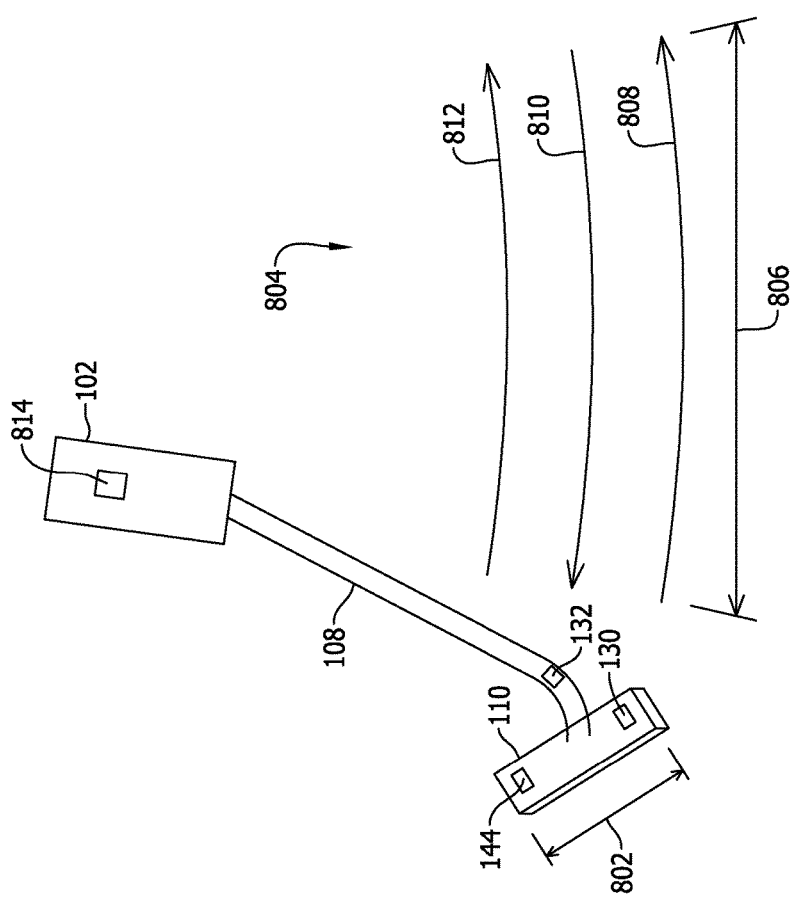
FIG. 8 is perspective view of the sweeper head in use with the machine shown in FIG. 1.

FIG. 8 is perspective view of sweeper head 110 in use with machine 100 (shown in FIG. 1). Sweeper head 110 includes known dimensions, particularly a known width 802. To determine an approximate floor area covered by sweeper head 110 during a period of use, such as, but not limited to, a shift, 3-axis brush accelerometer 144 records a trajectory of a plurality of swathes 804 made and a calculation is made using the length 806 of each swathe 808, 810, 812 of plurality of swathes 804 and width 802 that determines the approximate floor area covered by sweeper head 110 in the period of use. Brush accelerometer 144 can facilitate determining when a swathe 808, 810, 812 overlaps an adjacent swathe and thereby detect that the user is repeatedly covering the same area. An accurate recording of where machine 100 has been within a set of predetermined boundaries, such as within a building, parking lot, street, and the like is determined using a position receiver 814, such as, but not limited to, a GPS receiver, a Wi-Fi position system (WIPS), an indoor positioning system (IPS), and the like. Accordingly, using the location of where machine 100 has been, a relative position of sweeper head 110 with respect to machine 100, and the area covered in each swathe, a map of the area covered during a selectable period of time can be generated.

Moreover, brush accelerometer 144 can also facilitate performing "dead-reckoning" to measure only fresh area or ground covered. In the example embodiment, brush pressure sensor 130 is used to determine that sweeper head 110 is in contact with the floor surface and that productive vacuuming is occurring. In various embodiments, brush exit pressure sensor 132 and/or hose exit pressure sensor 134 are used for the same purpose. In addition housing accelerometer 146 may be used as a pedometer to record distance walked to verify the dead reckoning.

In addition to monitoring a productivity of machine 100 and its operator, conditions needing corrective maintenance and/or replenishment of consumables associated with machine 100 are monitored using various sensors described above. In some embodiments, the sensors provide their outputs to for example, motion and sensor processor 200, directly, through preprocessing circuits, or virtually using models of at least some of the processes occurring within machine 100. For example, in an area that is not instrumented with a sensor, a virtual sensor can be inferred using the outputs of other sensors and knowledge of the process between the other sensors and the location that is desired to be monitored. For example, a blockage of filter assembly 114 or HEPA filter 126 can be determined when a pressure drop, as measured by pressure sensor 140 and fan discharge pressure sensor 138 exceeds a threshold range. Additionally, a difference between readings of a single sensor, such as fan discharge pressure sensor 138, captured before and after starting fan 118 can be used to determine the across filter assembly 114 or HEPA filter 126.

In the example embodiment, machine 100 is able to detect a seized motor 120 using, for example, pressure sensor 136 determining a lack of vacuum at inlet to fan 118, motor current sensor 158, or battery current exceeding a threshold range. Other sensors may be used to provide an input to motion and sensor processor 200 to verify that motor 120 is seized. Motor 120 may also exhibit signs of seizure when power source 506 is approaching end of life, or when battery gas gauge 156 determines power source 506 capacity is below a threshold range. Hose 106 becoming blocked may also exhibit similar sensor indications or may confound the indications of motor 120 seizure. A difference between brush exit pressure sensor 132 and hose exit pressure sensor 134 may indicate a motor 120 seizure or a blockage of hose 106. Fan discharge low sensor 142 also indicates a no/low flow condition due to blockage or failure of motor 120 or power source 506. Conditions needing corrective maintenance and/or replenishment of consumables associated with machine 100 are reported to the operator via icons on UI 168 and/or UI 170. Additionally, all conditions can be reported to the supervisor in "real-time" via network 410, communication link 412, or other communications channel.

Other conditions requiring attention that are determined using the sensors of machine 100 include a reduced air flow, bag full detection, bag weight increase rate, rate of power usage, projection of vacuuming time remaining, bag change detection and bag life remaining. Reduced air flow is detected using, for example, fan discharge flow sensor 142 for filter, bag, or partial blockage. Reduced air flow is detected using hose exit pressure sensor 134, filter assembly pressure sensor 136, and/or fan discharge pressure sensor 138 to infer airflow assuming that motor 120 and fan 118 are operating correctly. Bag full detection assumes that motor 120 and fan 118 are operating correctly and uses a differential pressure between hose exit pressure sensor 134 and filter assembly pressure sensor 136 together with a differential pressure between fan discharge pressure sensor 138 and filter assembly pressure sensor 136 to infer bag full. A hag full confirmation signal may be generated using a differential pressure between hose exit pressure sensor 134 and filter assembly pressure sensor 136, and flow sensor 142.

A rate of increase of the weight of the particulate bag/filter assembly 114 is determined on a continuous basis in real-time using load cells 176 between mechanical portion 102 and harness 107 or mechanical portion 102 and wheels 109, for a floor-mounted mechanical portion 102, which measures the total machine weight. As dirt is picked up by the operation of machine 100, particulate bag/filter assembly 114 stores the dirt, thereby increasing the weight of mechanical portion 102. Averaging and processing of the load cell signals is performed in, for example, machine controller 164 and/or microprocessor 602 to detect a gradual weight increase of particulate bag/filter assembly 114.

Figure 9:
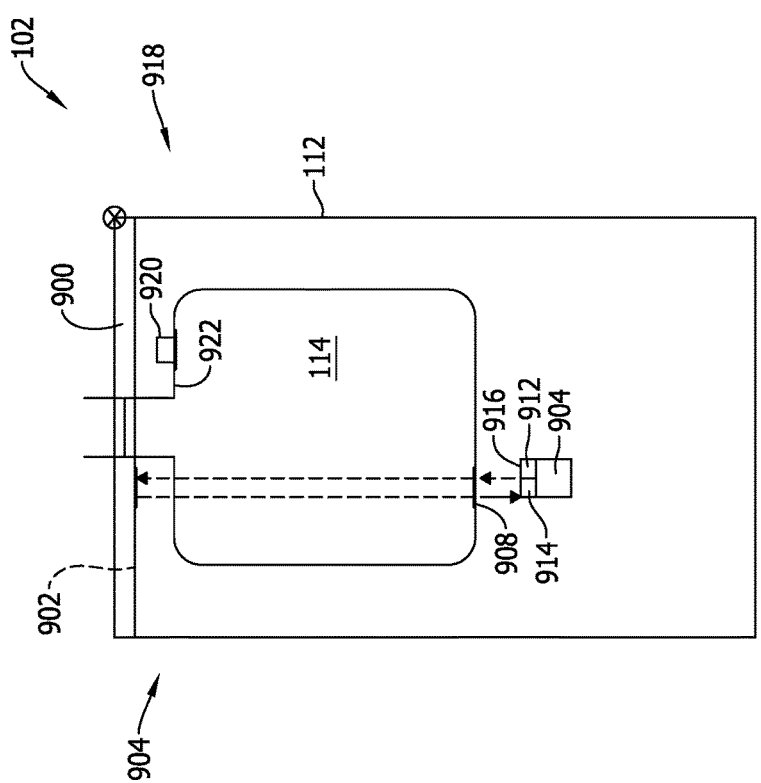
FIG. 9 is a cutaway view of the mechanical portion, shown in FIG. 1, illustrating a bag change sensor that may be used with the machine shown in FIG. 1.

FIG. 9 is a cutaway view of mechanical portion 102 illustrating a bag change sensor that may be used with machine 100 (shown in FIG. 1). In the example embodiment, housing 112 includes a lid 900 configured to close an opening 902 in an upper end 904 of housing 112. An optical transceiver 906 or transmitter/receiver pair is used to detect when the particulate bag/filter assembly 114 is present or removed. In one embodiment, a foil reflector 908 on particulate bag/filter assembly 114 or a foil reflector 910 on an underside of lid 900 provides the optical path between a transmitter 912 and a receiver 914 of optical transceiver 906. In various embodiments, a large optical window 916 facilitates avoiding a sensitivity to dirt contamination.

An end of bag life counter device 918 is configured to determine if a bag has been removed and replaced n times. If yes, a foil fuse 920 in a cardboard frame 922 of particulate bag/filter assembly 114 is electronically blown. Machine controller 164 (shown in FIG. 1) and/or microprocessor 602 (shown in FIG. 6) detect the open circuit to indicate to the operator that particulate bag/filter assembly 114 has expired. Additionally, electrical power used by machine 100 during a shift is a metric that has a plurality of uses for determining a health of machine 100 and/or corrective maintenance and/or replenishment of consumables. In the example embodiment, a coulomb counter 507 associated with battery gas gauge sensor 156 is used to record total charge used during shift. In one embodiment, coulomb counter 507 measures power used by machine 100 so that swapping batteries during a shift will not affect the power used tally. In other embodiments, coulomb counter 507 is associated with power source 506 so that power used from power source 506 and charge put into power source 506 can be measured, which would aid in determining not only a state of charge of power source 506, but also a declining capacity over time. Battery gas gauge sensor 156 and coulomb counter 507 can also be used to detect useful charge remaining and a number of charge/discharge cycles experienced by power source 506.

Figure 10:
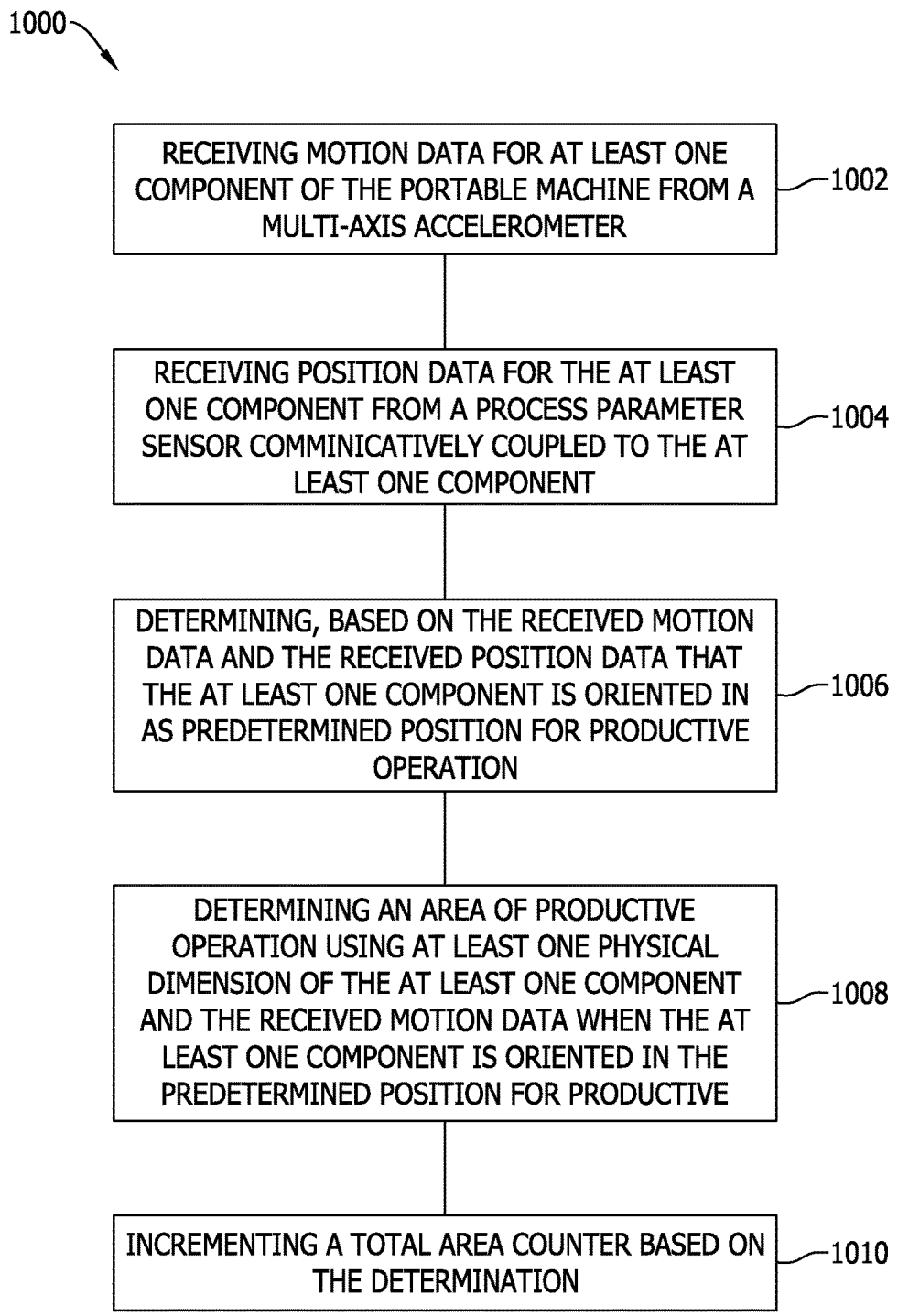
FIG. 10 is a flow chart of a method of monitoring productivity of a portable machine.

FIG. 10 is a flow chart of a method 1000 of monitoring productivity of a portable machine. In the example embodiment, the portable machine is embodied in a portable cleaning device, such as, but not limited to a back-mounted vacuum cleaning device. In the example embodiment, method 1000 includes receiving 1002 motion data for at least one component of the portable machine from a multi-axis accelerometer, receiving 1004 position data for the at least one component from a process parameter sensor communicatively coupled to the at least one component, and determining 1006, based on the received motion data and the received position data that the at least one component is oriented in a predetermined position for productive operation. Method 1000 also includes determining 1008 an area of productive operation using at least one physical dimension of the at least one component and the received motion data when the at least one component is oriented in the predetermined position for productive operation and incrementing 1010 a total area counter based on the determination.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The following detailed description illustrates embodiments of the disclosure by way of example and not by way of limitation. It is contemplated that the disclosure has general application to manufacturing, operating, servicing hand-held and manually operated machines, and implements in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by mobile devices, clusters, personal computers, workstations, clients, servers, and processor 205, 305 wherein the memory includes RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments or portions of the embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network. The technical effect of the methods and systems may be achieved by performing at least one of the following: tracking the location of machine 100, tracking a location of sweeper head 110 relative to the location of machine 100, monitoring filter condition for peak efficiency, motion sensing for cleaning efficiency, productivity, and monitoring of a typically unsupervised workforce, determining operating hours for scheduled maintenance and to enforce machine maintenance intervals, detection of improper operating technique to identify a need for training or re-training, determining which device is the best for the cleaning solution, tracking distance traveled, which correlates to operator exertion and operator calories burned, where operator fatigue is calculated by motion of wand assembly 104, and real time power consumption monitoring for energy regulation compliance.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of monitoring productivity of a vacuum cleaning system that includes a wand assembly and a mechanical portion including a fan coupled to a motor, the method comprising:
   receiving first motion data for a cleaning head of the wand assembly from a multi-axis accelerometer coupled to the wand assembly;
   comparing the received cleaning head motion data to a predetermined motion threshold indicating a proper operating technique of the vacuum cleaning system;
   receiving position orientation data for the cleaning head from a process parameter sensor coupled to the cleaning head;
   receiving pressure data from a pressure sensor;
   receiving flow data from a flow sensor;
   determining, based on the received cleaning head motion data and the received cleaning head position orientation data that the cleaning head is oriented in a predetermined position for productive operation of the vacuum cleaning system;
   indicating, to an operator of the vacuum cleaning system, when the cleaning head is not oriented in a predetermined position for productive operation of the vacuum cleaning system or when accelerations of the cleaning head are outside an acceleration range that indicate proper operation of the wand assembly for optimum efficiency and productivity;
   receiving second motion data for the cleaning head that indicates the cleaning head is oriented in the predetermined position or that accelerations of the cleaning head are within the acceleration range that indicates proper operation;
   determining a total floor area of productive operation of the vacuum cleaning system using at least one physical dimension of the cleaning head and the received cleaning head motion data when the cleaning head is oriented in the predetermined position for productive operation at least one of scheduling maintenance on the vacuum cleaning system and replacing consumables associated with the vacuum cleaning system based on the total floor area of productive operation; and incrementing a total floor area counter based on the determination.

2. The method of claim 1, wherein receiving pressure data from a pressure sensor comprises receiving pressure data from the pressure sensor configured to indicate a distance of the cleaning head to a surface.

3. The method of claim 1, wherein receiving flow data from a flow sensor comprises receiving flow data from the flow sensor configured to indicate a distance of the cleaning head to a surface.

4. The method of claim 1, further comprising:
receiving position data in a building for the vacuum cleaning system;
determining a relative position of the cleaning head with respect to the vacuum cleaning system; and
determining a position in the building of the cleaning head using the received position data in the building for the vacuum cleaning system and the determined relative position of the cleaning head with respect to the vacuum cleaning system.

5. The method of claim 1, further comprising transmitting an indication of the total floor area counter wirelessly to a central server.

6. The method of claim 1, further comprising transmitting an indication of the total floor area counter wirelessly to a supervisory computer device.

7. The method of claim 1, wherein determining a total floor area of productive operation using at least one physical dimension of the cleaning head comprises determining a total floor area of productive operation using at least a width of the cleaning head in a direction perpendicular to a direction of motion of the cleaning head.

8. A portable cleaning machine comprising:
a mechanical portion including a fan coupled to a motor and configured to generate a cleaning force;
a cleaning head comprising a first physical dimension and coupled in flow communication to said mechanical portion;
a multi-axis accelerometer positioned on said cleaning head, said multi-axis accelerometer configured to generate motion data of the cleaning head; and
a machine controller configured to:
receive motion data for said cleaning head from said multi-axis accelerometer;
compare the received motion data to a predetermined motion threshold indicating a proper operating technique of said cleaning head;
receive position orientation data for said cleaning head from a process parameter sensor coupled to said cleaning head;
receive pressure data from a pressure sensor;
receive flow data from a flow sensor;
determine, based on the received motion data and the received position orientation data that said cleaning head is oriented in a predetermined position for productive operation;
indicate to an operator of the vacuum cleaning system when the cleaning head is not oriented in a predetermined position for productive operation of the vacuum cleaning system or when accelerations of the cleaning head are outside an acceleration range that indicate proper operation of the wand assembly for optimum efficiency and productivity;
receive second motion data for the cleaning head that indicates the cleaning head is oriented in the predetermined position or that accelerations of the cleaning head are within the acceleration range that indicates proper operation;
determine a total floor area of productive operation of the vacuum cleaning system using at least one physical dimension of said cleaning head and the received motion data when said cleaning head is oriented in the predetermined position for productive operation;
at least one of schedule maintenance on the vacuum cleaning system and replace consumables associated with the vacuum cleaning system based on the total floor area of productive operation; and
increment a total floor area counter based on the determination.

9. The portable cleaning machine of claim 8, further comprising a mechanical portion position receiver configured to determine a location within predetermined boundaries of said mechanical portion.

10. The portable cleaning machine of claim 8, further comprising a motion and sensor processor configured to determine a location of said cleaning head within a set of predetermined boundaries.

11. The portable cleaning machine of claim 10, wherein said motion and sensor processor is configured to map an area covered by said cleaning head based on the total floor area counter and the location of said cleaning head within a set of predetermined boundaries.

12. The portable cleaning machine of claim 8, further comprising a motion and sensor processor configured to:
receive motion data from said multi-axis accelerometer; and
determine that the received motion data is within a threshold range of predetermined motion data.

13. One or more non-transitory computer-readable storage media having computer-executable instructions embodied thereon, wherein when executed by at least one processor, the computer-executable instructions cause the at least one processor to:
receive motion data for a cleaning head of a vacuum cleaning system from a multi-axis accelerometer mounted on the cleaning head;
receive position data for said cleaning head from a process parameter sensor coupled to said cleaning head;
receive pressure data from a pressure sensor;
receive flow data from a flow sensor;
determine, based on the received motion data and the received position data that said cleaning head is oriented in a predetermined position orientation for productive operation;
compare the received motion data to a predetermined motion threshold indicating a proper operating technique of said cleaning head wherein the proper operating technique includes the received motion data being within a predetermined acceleration threshold range and said cleaning head being maintained in a predetermined position orientation;
indicate to an operator of the vacuum cleaning system when the cleaning head is not oriented in a predetermined position for productive operation of the vacuum cleaning system or when accelerations of the cleaning head are outside an acceleration range that indicate proper operation of the wand assembly for optimum efficiency and productivity;

receive second motion data for the cleaning head that indicates the cleaning head is oriented in the predetermined position or that accelerations of the cleaning head are within the acceleration range that indicates proper operation;

determine a total floor area of productive operation of the vacuum cleaning system using at least one physical dimension of said cleaning head and the received motion data when said cleaning head is oriented in the predetermined position for productive operation;

at least one of schedule maintenance on the vacuum cleaning system and replace consumables associated with the vacuum cleaning system based on the total floor area of productive operation; and increment a total floor area counter based on the determination.

14. The computer-readable storage media of claim 13, wherein the computer-executable instructions further cause the processor to map the total floor area covered by said cleaning head based on the total floor area counter and a location of said cleaning head within a set of predetermined boundaries.

15. The computer-readable storage media of claim 13, wherein the computer-executable instructions further cause the processor to:
receive motion data from said multi-axis accelerometer; and
determine that the received motion data is within a threshold range of predetermined acceleration.

16. The computer-readable storage media of claim 13, wherein the computer-executable instructions further cause the processor to:
receive position location data within predetermined boundaries for the vacuum cleaning system;
determine a relative position of said cleaning head with respect to the vacuum cleaning system; and
determine a position, within the predetermined boundaries of the cleaning head using the received position location data in a building for the vacuum cleaning system and the determined relative position of the cleaning head with respect to the vacuum cleaning system.

17. The computer-readable storage media of claim 13, wherein the computer-executable instructions further cause the processor to transmit an indication of the total floor area counter wirelessly to at least one of a central server and a supervisory computer device.

* * * * *